Dec. 14, 1937.  V. K. NEWCOMER  2,102,330
CONVEYING APPARATUS
Filed Nov. 16, 1935
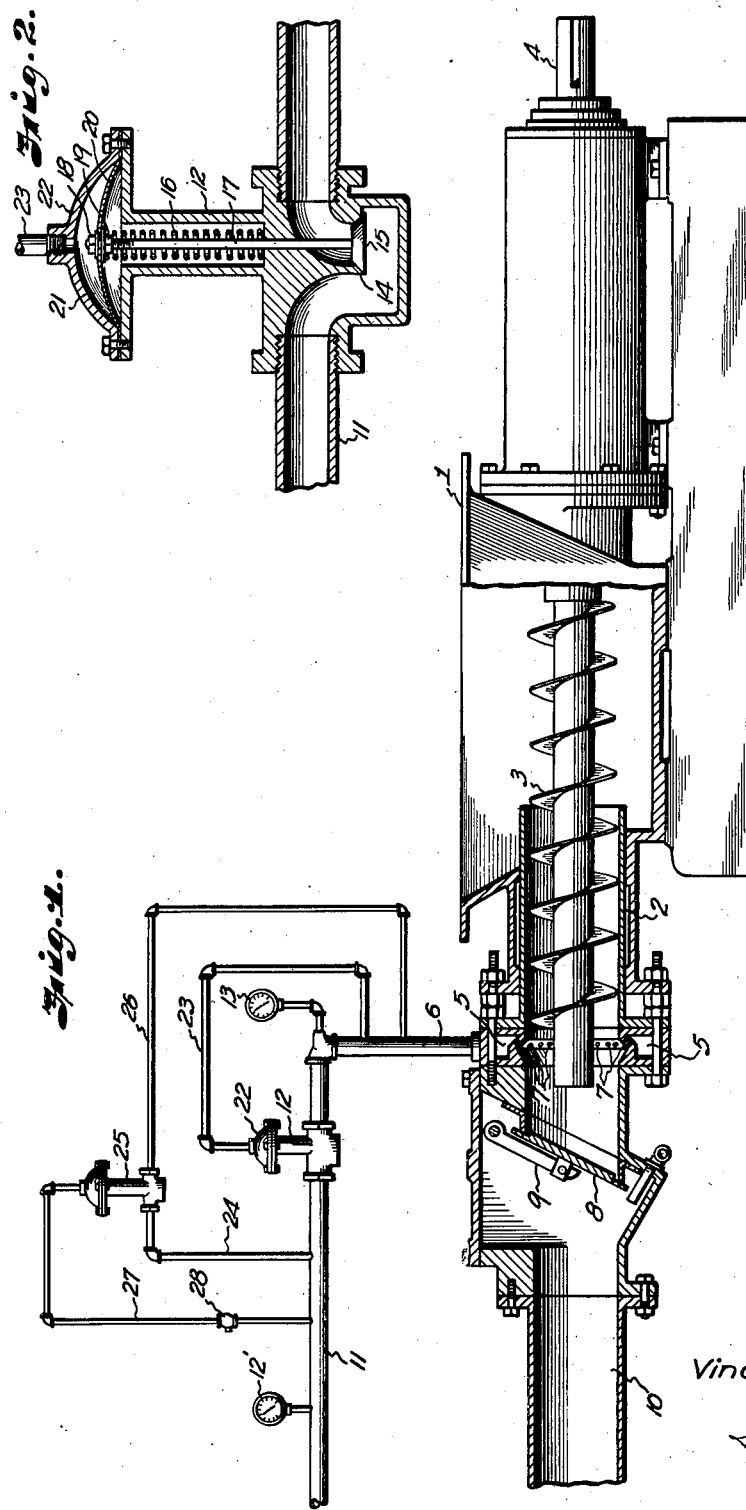
INVENTOR.
Vincent K. Newcomer
Thos. E. Scofield
ATTORNEY.

Patented Dec. 14, 1937

2,102,330

UNITED STATES PATENT OFFICE 2,102,330

CONVEYING APPARATUS

Vincent K. Newcomer, Independence, Mo.

Application November 16, 1935, Serial No. 50,166

5 Claims. (Cl. 302—50)

My invention relates to conveying apparatus and more particularly to apparatus for conveying pulverized or finely divided materials.

It is known to the art that admixing of a fluid such as air with finely divided or pulverized material will impart to the mixture many of the characteristics of a liquid, enabling it to flow by gravity through ducts or pipes. This is disclosed in U. S. Letters Patent No. 1,553,539, granted to A. G. Kinyon. The flow of material to a conveyor of this type is almost never constant, with the result that the compressed fluid, usually compressed air, runs to waste at times when there is no material to be conveyed in the hopper. Similarly, it frequently happens that a disproportionately large amount of air is employed for the moving of the pulverized material due to the fact that no satisfactory means for controlling the air supply has been developed.

One object of my invention is to provide a conveying apparatus for conveying finely divided materials in which a fluid is admixed with the finely divided materials to enable the mixture to flow, in which the fluid supply is controlled or governed in response to the requirements of the material being conveyed.

Another object of my invention is to provide an apparatus of the character described in which the compressed air is supplied in proportion to the loading of the material being conveyed.

Another object of my invention is to provide an apparatus of the character described in which the main air supply is automatically interrupted when the feed hopper becomes empty.

A further object of my invention is to provide an apparatus in which the main air supply is automaticaly reestablished after having been interrupted by the emptying of the hopper, when further material is to be conveyed.

Other and further objects of my invention will appear from the following description.

In the accompanying drawing which forms part of the instant specification and are to be read in conjunction therewith and in which like reference numerals are used to indicate like parts in the various views;

Figure 1 is an elevation of a conveying apparatus embodying one mode of carrying out my invention, shown with parts in section.

Figure 2 is an enlarged sectional elevation of a control valve employed in the embodiment shown in Figure 1.

In general, my invention contemplates the control of the main compressed fluid or air supply by a valve which is urged to closed position by means of a spring or the like and urged to open position by means of the air pressure existing in the air supply manifold and the bypassing of the main air supply control valve by a reducing valve discharging into the air manifold supplying air to the conveying apparatus.

More particularly referring to the drawing, the conveying apparatus may be of any suitable type and may comprise a hopper 1 provided with a discharge duct 2 into which the material placed in hopper 1 is conveyed by a conveyor screw 3. The conveyor screw 3 is driven by any suitable prime mover (not shown) by the rotation of shaft 4. At the outlet of duct 2 there is provided an annular manifold 5 into which compressed fluid such as air is adapted to pass through a pipe 6. The manifold is provided with a plurality of orifices 7 disposed around the internal periphery thereof through which the air for aerating the pulverized material is supplied. The aerated, pulverized material then flows past a check valve 8 which is hingedly mounted by means of a pivoted arm 9 through a pipe or duct 10 to the locus to which the material is being conveyed. The check valve arrangement is known to the art and has for its object the sealing of the duct 10 from the hopper to prevent the escape of the compressed air from the duct 10 through the hopper, blowing the material caught in the flights of the conveyor screw 3 out through the hopper.

The main air supply for aerating the pulverized material, for imparting mobility thereto, comes through pipe 11 which is connected to any suitable compressed air source (not shown). The gauge 12' indicates the line pressure. Line 11 communicates with pipe 6 through a control valve 12. The discharge from valve 12 communicates directly to pipe 6 which supplies air to the manifold 5. The manifold pressure is indicated by gauge 13. Valve 12 is shown in detail in Figure 2 and consists of a usual valve body, provided with a valve seat 14 and a valve 15. A spring 16 tends to hold the valve in seated position through valve stem 17. The tension of spring 16 may be adjusted by positioning of nuts 18 and 19 upon the valve stem. Clamped between nuts 18 and 19 is a diaphragm 20 positioned in a chamber 21 formed by a cover member 22. A pipe 23 provides communication between pipe 6 (in which the manifold pressure exists) and the chamber 21 on top of the diaphragm 20. It will be obvious from the construction that the pressure existing in pipe 6, acting through diaphragm 20 will tend to move valve 15 from its seat against the action of spring 16. The optimum pressure to be carried in line 11 is dependent upon the type of material to be conveyed and is determined empirically. This line pressure may be kept constant by the introduction of a reducing valve (not shown) between the compressed air source and the line 11. From the construction described it will be obvious that, as the load lessens, the back pressure to the discharge of air through orifices 7 decreases, thus lowering the pressure in manifold 5. Since this pressure is imposed upon the top of diaphragm 20, there will be less force resisting the action of spring 16, thus permitting valve 15 to move toward closed position throttling the passage of compressed air from the main line 11 and reducing the volume of air supplied. Should the back pressure to the discharge of air through orifices 7 increase by a denser batch of pulverized material, the pressure in manifold 5 will increase. This increased pressure being communicated to the top of diaphragm 20 will again move the valve to permit an increased volume of air from main 11 to pass. It will be readily understood that this action is continuous and automatic, the air supplied being proportioned to the load. Should the hopper become empty a free flow of air through orifices 7 will take place. When this occurs, the back pressure being small, the adjustment of the spring is such that it will overcome the manifold pressure when this condition exists. In other words, the spring 16 of valve 12 is adjusted so that, with no material in the hopper and the desired line pressure in main 11, it will close the valve 15 against whatever pressure then exists in the manifold 5.

If valve 12 were all that were employed when this condition obtained, and a fresh supply of material were placed in hopper 1, the valve 15 being on its seat, no air would be supplied and though the pulverized material were closely packed around the orifices 7, yet the valve 15 would remain upon its seat and the pulverized material would not be aerated for conveyance and flow to the desired locus. To overcome this difficulty, I bypass the valve 12 by a branch line 24 communicating with the main 11 at a point before the valve, a reducing valve 25 and a branch line 26 conducting the output of the reducing valve 25 to the line 6 and manifold 5. The reducing valve 25 may be of any suitable type known to the art and is controlled by air supplied through a small pipe 27 controlled by a valve 28. The adjustment of reducing valve 25 is such that with no material in the hopper it will throttle the main line pressure through line 24 to any desired predetermined small pressure. For example, if the main line pressure were 15 pounds per square inch, the reducing valve 25 would be adjusted so that the air through line 26 would have a pressure of one pound. This pressure is automatically maintained by the valve as is well known to the art of reducing valves.

In order to obtain a conception of the relative size of the lines used, if line 11 were a two inch line and carried 15 pounds per square inch pressure, line 27 would be a three eighths inch line, line 24 would be a three fourths inch line, line 26 would be a one half inch line, and line 23 would be a three fourths inch line. With the construction shown, should the condition heretofore described exist, namely valve 15 in a closed position and a fresh load of pulverized material in the hopper, the back pressure to eduction of fluid, from manifold 5, being increased by the presence of material tending to close the orifices 7, will cause the supply of air at one pound pressure entering line 6 through line 26 to act upon the top of diaphragm 20 through line 23. When this occurs, valve 15 will be lifted off its seat, allowing additional air to enter line 6 from the main 11. The back pressure still being high, the increment of pressure in the manifold will be communicated to diaphragm 20 opening valve 15 further and to its required extent to enable a sufficient volume of air to be supplied to aerate the pulverized material.

It is believed that the operation of my apparatus will be clear from the foregoing description. It will be seen that I have accomplished the objects of my invention. I supply air in proportion to the load and provide means for reestablishing the supply of air after it has been interrupted by a cessation of demand. In practice, I have been able to reduce the compressed air load of a conveyor of the character described by 50 percent. It will be readily appreciated that this saving is effected by the difference in volume of air which will pass through a two inch line at 15 pounds pressure, that is, the air which would escape through the main at 15 pounds when the hopper is emptied as against that which escapes through a one half inch line at one pound pressure. It will be seen that, in my construction, when the hopper is empty, the only air which escapes is that at a pressure of one pound through the one half inch line 26.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a conveying apparatus in which finely divided materials are admixed with air, an air distributing manifold, a conduit for supplying air to said manifold, a valve in said conduit, and means responsive to the air pressure in said manifold for controlling said valve.

2. In a conveying apparatus in which finely divided materials are admixed with air, an air distributing manifold, a conduit for supplying air to said manifold, a valve in said conduit, means responsive to the air pressure in said manifold for controlling said valve, and means by-passing said valve for introducing air into said manifold.

3. In a conveying apparatus in which finely divided materials are admixed with air, an air distributing manifold, a conduit for supplying air to said manifold, a valve in said conduit, means responsive to the air pressure in said manifold for controlling said valve, and means for introducing air into said manifold when said valve is closed.

4. In a conveying apparatus in which finely divided materials are admixed with air, an air distributing manifold, a conduit for supplying air to said manifold, a valve in said conduit, means responsibe to the air pressure in said manifold for controlling said valve, a line by-passing said valve providing communication between the air supply and said manifold, and a reducing valve in said line whereby air at reduced pressure is supplied to said manifold when said valve is closed.

5. In a conveying apparatus in which finely divided materials are admixed with air, an air distributing manifold, a conduit for supplying air to said manifold, a valve in said conduit, means responsive to the air pressure in said manifold for controlling said valve, and a second conduit for supplying air to said manifold irrespective of the pressure therein.

VINCENT K. NEWCOMER.